United States Patent [19]
Stapleton

[11] Patent Number: 5,408,254
[45] Date of Patent: * Apr. 18, 1995

[54] PLOTTER FINISHED PLOT HANDLER CONTROL SYSTEM

[75] Inventor: Jeff Stapleton, Huntington Beach, Calif.

[73] Assignee: Calcomp Inc., Anaheim, Calif.

[*] Notice: The portion of the term of this patent subsequent to Jan. 5, 2010 has been disclaimed.

[21] Appl. No.: 131,372

[22] Filed: Oct. 4, 1993

[51] Int. Cl.6 .................. G01D 15/28; B65H 29/00
[52] U.S. Cl. ......................... 346/134; 346/136; 271/184; 271/187
[58] Field of Search ................ 346/134, 136; 271/184, 271/187

[56] References Cited
U.S. PATENT DOCUMENTS
5,177,497  1/1993  Calderon et al. .................. 346/1.1

Primary Examiner—Joseph W. Hartary
Assistant Examiner—Craig A. Hallacher
Attorney, Agent, or Firm—Wm F. Porter, Jr.; Robert M. Wallace

[57] ABSTRACT

A control system and method of operation for controlling the operation of a finished plot handling and rolling mechanism of a plotter. If the finished plot is not properly gripped for rolling, the rolling process is aborted and the plot ejected unrolled. During rolling, power to the driving mechanism is maintained at a level which will keep the media taut and prevent over powering. At the plot end, the media is made taut over the platen for consistent cutting. The trailing end is then accelerated at a level which will overcome static friction of the previously rolled portion and prevent buckling of the trailing portion.

4 Claims, 4 Drawing Sheets

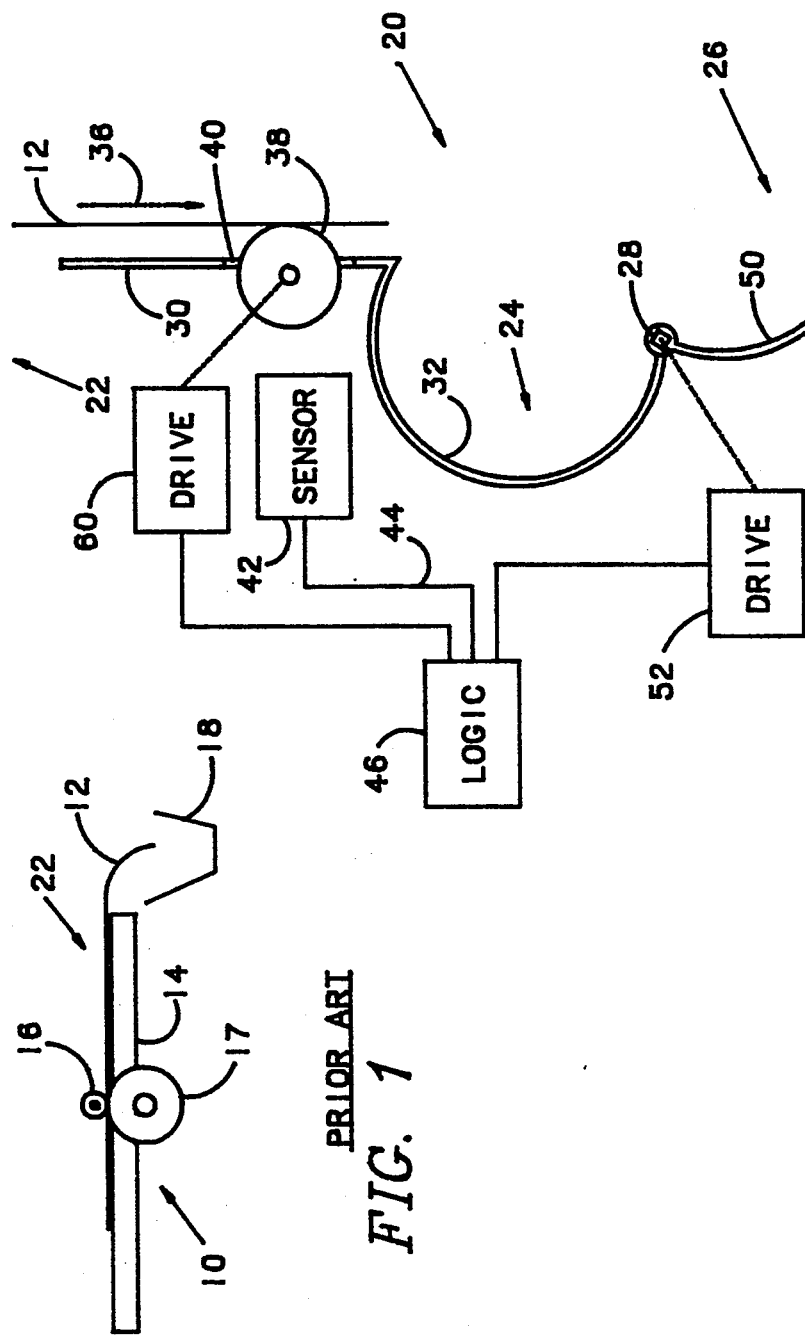
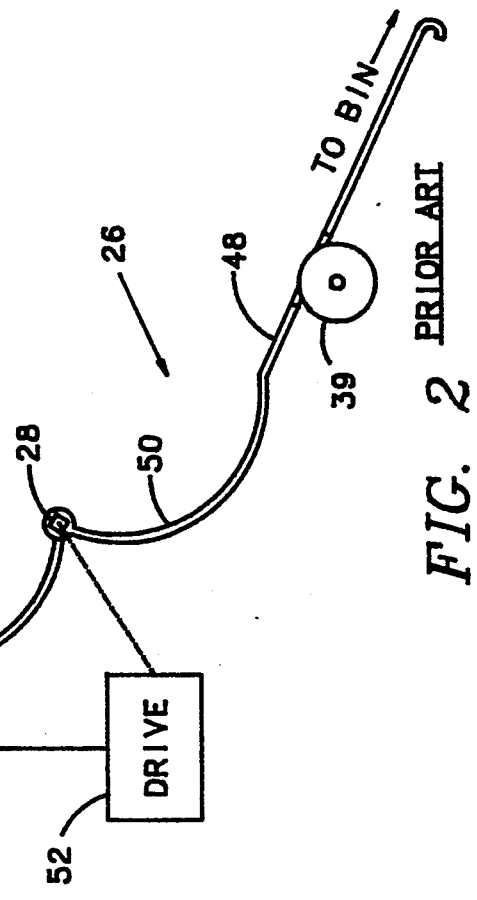
FIG. 1 PRIOR ART
FIG. 2 PRIOR ART

PLOTTER FINISHED PLOT HANDLER CONTROL SYSTEM

BACKGROUND OF THE INVENTION

1. Technical Field

This invention relates to plotters producing plots on rollable media and, more particularly, to a control system and method of operation for controlling the operation of a finished plot handling and rolling mechanism of a plotter. If the finished plot is not properly gripped for rolling, the rolling process is aborted and the plot ejected unrolled. During rolling, power to the driving mechanism is maintained at a level which will keep the media taut and prevent over powering. At the plot end, the media is made taut over the platen for consistent cutting. The trailing end is then accelerated at a level which will overcome static friction of the previously rolled portion and prevent buckling of the trailing portion.

2. Background Art

Pen plotters are popular so-called peripheral devices for use with computers, particularly in conjunction with applications programs such as CAD/CAM. They have an advantage over other forms of plotting of being simple in operation and construction and, therefore, lower in price. As shown in simplified form in FIG. 1, a basic pen plotter 10 after drawing the plot on the media 12 may simply move the media 12 over a support table 14 by means of a pinch roller 16 holding the media 12 against a driven drum 17 to eject the completed plot into a receiving bin 18. With large plot sheets, the completed plot can wrinkle and cause problems and poor print quality when later reproduction by a diazo process, or the like, is attempted. Attempting to roll the randomly-folded plot onto a old media roller for safekeeping is a time-consuming and often frustrating process.

In more complex and costly devices such as electrostatic printers and plotters, a media rolling apparatus is sometimes included as part thereof. Such prior art attempts are large and expensive and, typically, incorporate a lot of surface area over which the moving media must be moved against the friction imposed thereby. Overcoming the frictional considerations adds to the complexity and cost of the apparatus.

A prior invention assigned to the assignee of this application is disclosed in U.S. Pat. No. 5,177,497 which issued 5 Jan. 1993. The apparatus of that patent and its manner of construction and operation is shown in FIGS. 2 through 4. The rolling mechanism 20 of that invention is intended to be mounted between the ejection point 22 and the receiving bin 18 in a pen plotter 10 such as that depicted in simplified form in FIG. 1. The exact placement and the specific shape of the components are, of course, a function of the pen plotter 10 into which the rolling mechanism 20 is incorporated.

Starting with the mechanism 20 in its open position as depicted in FIG. 2, there is a stationary portion 24 and a rotating portion 26 which is mounted on and rotates in combination with the shaft 28. The stationary portion 24 comprises a first input guide portion 30 connected to a first partially-cylindrical portion 32. Thus, as the media 12 moves along its exit path 36, it moves over the input guide portion 30 as depicted in FIG. 2. A single, horizontal, cylindrical drive roller 38 is disposed behind the input guide portion 30 in the center thereof and extends through a slot 40 provided in the supporting structure of the first input guide portion 30 for the purpose. Because of the low friction environment of this invention, one drive roller 38 in the center is sufficient and preferred, but several across the width of the media could be employed if desired. A media-presence sensor 42 is provided for sensing the presence of a leading edge of the media 12 at the location of the drive roller 38. The sensor 42 can be of any convenient type known to those skilled in the art for such purposes (mechanical or electrical) and simply provides a signal on its output line 44 to the control logic 46 when there is media 12 positioned below the drive rollers 38. Actually, the sensor 42 in the drawings is suggestive in nature only and its function may be accomplished through the use of components of the pen plotter itself. For example, it is suggested therein that the sensor 42 comprise a sensing of the position of the drum 17 of FIG. 1 by the logic 46 which knows the position of the media with respect to revolutions of the drum it has accomplished and, therefore, when it has employed the drum 17 to move the media 12 far enough towards the ejection point 22 to be below the drive rollers 38.

The rotating portion 26 comprises a second input guide portion 48 connected to a second partially-cylindrical portion 50. The second input guide portion 48 carries a free-wheeling roller 39 positioned to mate with the drive roller 38 with the media 12 therebetween as will be seen shortly. The two partially-cylindrical portions 32, 50 are pivotally joined at the location of the shaft 28. The shaft 28 is bi-directionally rotated by any appropriate drive mechanism 52 (motor or solenoid, with a motor being preferred) under the control of the logic 46 to rotate the rotating portion 26 between the open position of FIG. 2 and the closed position of FIG. 3.

In operation, with the mechanism 20 in its open position of FIG. 2, the drive rollers 38 are inactivated. As the leading edge of the media 12 passes over the drive roller 38, the fact is sensed by the sensor 42 as described above, which sends a signal to the logic 46 (or is known by the logic 46 through its interaction with the sensing process). Upon the leading edge of the media 12 having entered the rolling mechanism 20 to a point below the drive rollers 38, the logic 46 activates the drive mechanism 52 to rotate the rotating portion 26 to the closed position of FIG. 3.

As can be seen in FIG. 3, in the closed position the two input guide portions 30, 48 form a guide slot 54 extending into a cylindrical rolling chamber 56 formed by the two partially-cylindrical portions 32, 50. The drive rollers 38 (which preferably have a soft, resilient outer surface) are pressed lightly against the free-wheeling rollers 39 with the media 12 therebetween. The rotating portion 26 is maintained in the closed position of FIG. 3 by the drive mechanism 52. When the rotating portion 26 is in the closed position of FIG. 3, the logic 46 then activates the drive mechanism 60 which is connected to rotate the drive rollers 38. The drive rollers 38 then gently urge the media 12 forward through the guide slot 54 into the cylindrical rolling chamber 56 where it is smoothly rolled as shown in FIG. 3. When the logic 46 recognizes that the trailing edge of the media 12 has been reached, the logic 46 stops the drive mechanism 60 and activates the drive mechanism 52 in the opposite direction to open the rotating portion 26 to the open position of FIG. 4 whereupon the smoothly and neatly rolled media 12' falls into the receiving bin 18. The disclosure of the patent suggest that the position of the trailing edge of the media 12 does not have to be physically sensed as it is known to the logic 46 because the logic 46 knows how large the media 12 is in length and how much of the media 12 has been moved by the driving rollers 38.

While the apparatus of FIGS. 2–4 works well for its intended purpose, there are several aspects which can be improved for various reasons. For example, every component which can be eliminated reduces the cost of manufacture, which is a major driving force in a highly competitive business such as computer-driven plotters. Also, provision must be made for fail-safe operation—without adding to the cost of manufacture thereby. That is, provision must be made for the situation which may occur where, for some reason, the finished plotting media does not properly enter the rolling mechanism. This cannot simply be ignored.

Wherefore, it is an object of the present invention to provide a control system for a finished plot handler which provides accurate control of the apparatus with a minimum number of components.

It is another object of the present invention to provide a control system for a finished plot handler which provides fail safe operation in the event of a malfunction.

Other objects and benefits of this invention will become apparent from the description which follows hereinafter when read in conjunction with the drawing figures which accompany it.

SUMMARY OF THE DISCLOSURE

The foregoing objects have been achieved by the control system of the present invention for operating a finished plot handling apparatus of a pen plotter ejecting sheets of a flexible media and including a drive drum for moving the media and the finished plot handling apparatus for receiving the sheets at an exit point and for rolling the sheets upon ejection from the pen plotter including,

- a stationary member comprising a first input guide portion connected to a first partially-cylindrical portion, the first input guide portion being disposed adjacent the exit point behind a path followed by a leading edge of the media as it is ejected from the pen plotter,
- a rotating member comprising a second input guide portion connected to a second partially-cylindrical portion along an edge opposite an edge mounted for rotation about an axis of rotation between a closed position with the first partially-cylindrical portion and the second partially-cylindrical portion in combination forming a cylindrical rolling chamber and the first input guide portion and the second input guide portion in combination forming a guide slot into the cylindrical rolling chamber and an open position with the second partially-cylindrical portion and the second input guide portion forming a ramp towards a receiving point located below the exit point,
- first drive means for bi-directionally rotating the rotating member about the axis of rotation,
- drive roller means disposed through the first input guide portion perpendicular to the path in the first input guide portion for contacting and moving the media through the guide slot into the cylindrical rolling, chamber when the rotating member is in the closed position, and
- second drive means for rotating the drive roller means, wherein the control system for operating the finished plot handling apparatus of the present invention comprises, first adjustable voltage means connected for applying a voltage to the first drive means; second adjustable voltage means connected for applying a voltage to the second drive means; first current sensing means for sensing current flowing from the first adjustable voltage means to the first drive means and for outputting a digital signal reflecting the current at an output thereof; second current sensing means for sensing current flowing from the second adjustable voltage means to the second drive means and for outputting a digital signal reflecting the current at an output thereof; position sensing means for sensing a rotational position of the drive drum and for outputting a digital signal reflecting the position at an output thereof; and, logic means having inputs connected to the output of the first current sensing means, the output of the second current sensing means, and the output of the position sensing means and outputs connected to the first adjustable voltage means, the second adjustable voltage means, and a motor driving the drive drum for,

- with the rotating member in the open position, using the motor driving the drive drum to move a leading edge of a sheet of the media to be rolled to a position below the drive roller means,
- using the first adjustable voltage means to cause the first drive means to rotate the rotating member to the closed position,
- starting at a low voltage using the second adjustable voltage means to cause the second drive means to rotate the drive roller means to move the sheet of the media through the guide slot into the cylindrical rolling chamber while sensing any movement of the drive drum with the position sensing means,
- terminating a plot rolling process and using the first adjustable voltage means to cause the first drive means to rotate the rotating member to the open position to release the sheet of the media if an upper voltage limit of the second adjustable voltage means is reached without movement of the drive drum being sensed,
- saving a minimum current level to the second drive means causing movement of the drive drum,
- using the second adjustable voltage means while adjusting the voltage level thereof to maintain current level to the second drive means at the minimum current level to keep the media taut without stalling the second drive means while simultaneously using the motor driving the drive drum to move the sheet of the media towards the drive roller means to cause the second drive means to rotate the drive roller means to move the sheet of the media through the guide slot into the cylindrical rolling chamber until an end of plot point of the media is reached,
- holding the drive drum against rotation while continuing to apply voltage to the second drive means for a period of time sufficient to make the media taut for cutting,
- activating a cutting mechanism to cut the media, and
- starting at a low voltage using the second adjustable voltage means to accelerate the second drive means to rotate the drive roller means to move a trailing portion of the sheet of the media through the guide slot into the cylindrical rolling chamber at a rate sufficient to overcome static friction of a previously rolled portion of the media within the cylindrical rolling chamber without buckling the trailing portion.

BRIEF DESCRIPTION OF THE DRAWINGS

FIG. 1 is a simplified drawing of a finished plot handler according to a first prior art technique.

FIG. 2 is a partial functional block diagram drawing of a finished plot handler and its manner of control according to a second prior art technique.

DETAILED DESCRIPTION OF THE PREFERRED EMBODIMENT

Figures 3, 4:
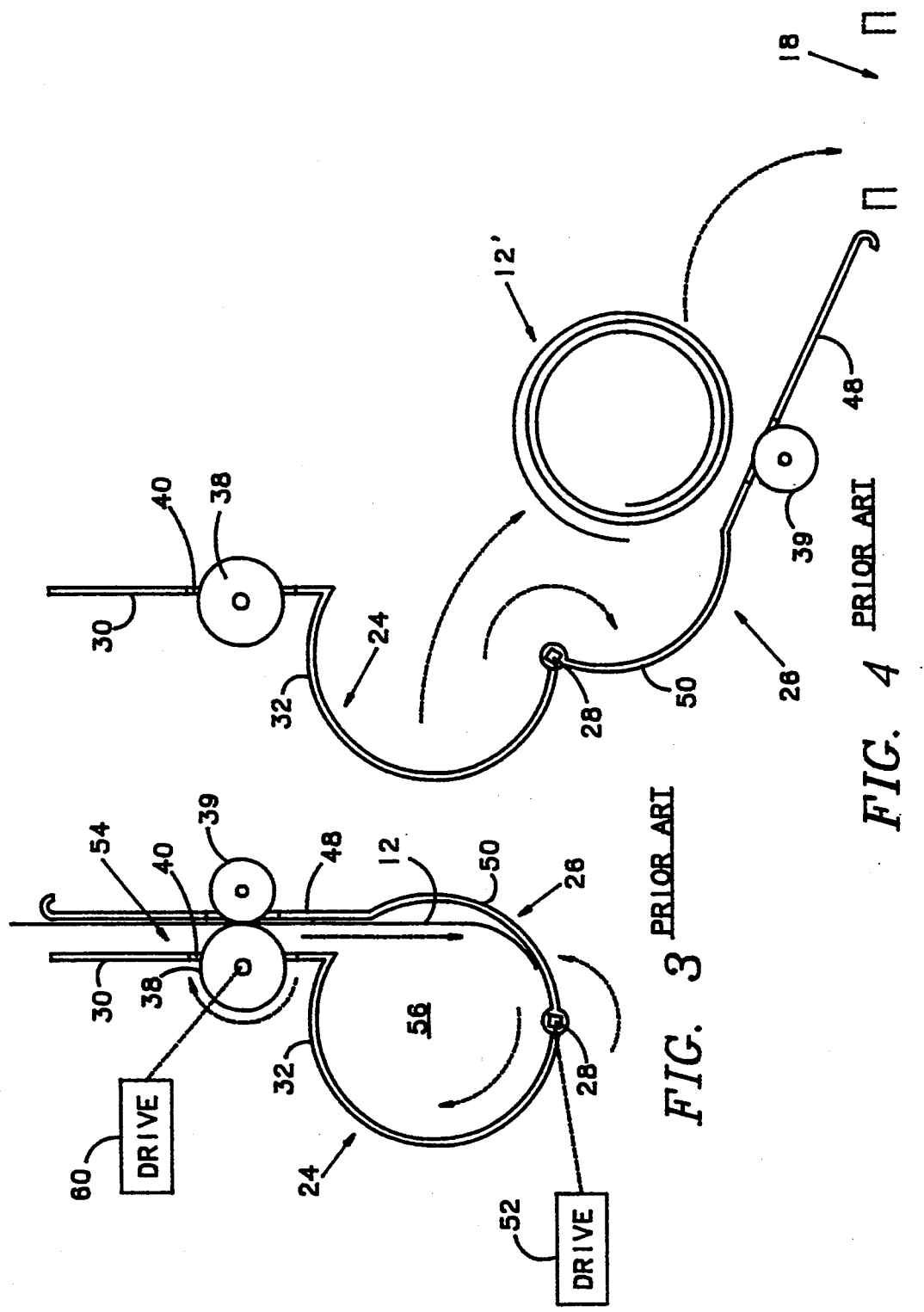
FIG. 3 shows the finished plot handler of FIG. 2 in the process of rolling a finished plot.
FIG. 4 shows the finished plot handler of FIG. 2 in the process of releasing a rolled finished plot.
Figure 5:
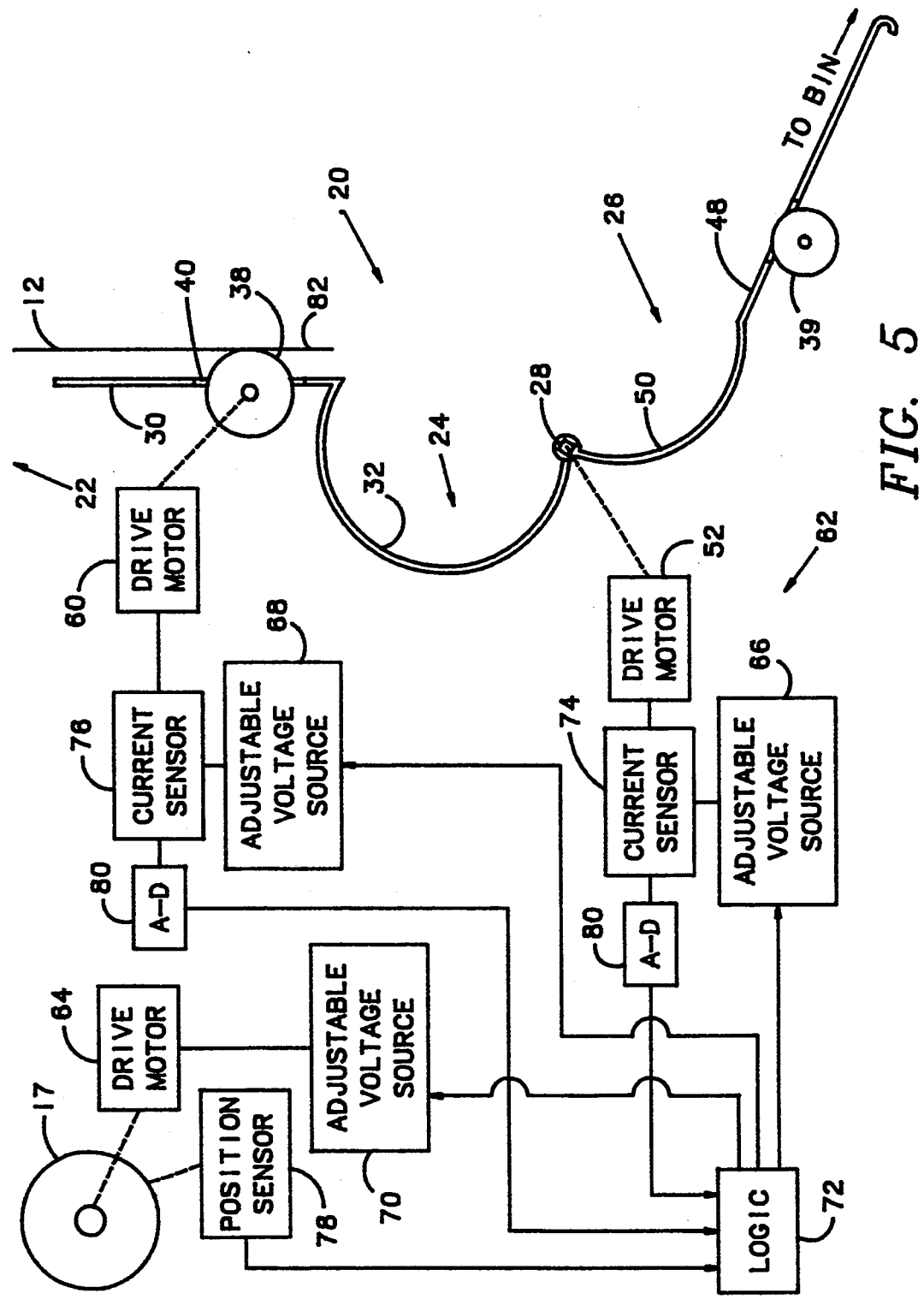
FIG. 5 shows a plotter finished plot handler control system according to the present invention.

The "clamshell" finished plot rolling apparatus 20 of FIGS. 2-4 connected to a control system 62 according to the present invention is shown in FIG. 5. Also appearing in FIG. 5 as employed in the control logic of the present invention is the plotter's drive drum 17 which, as described with respect to FIG. 1, in combination with pinch rollers 16 selectively drives the media 12 forward and backward. The drive drum 17 is powered by a drive motor 64.

Figure 6:
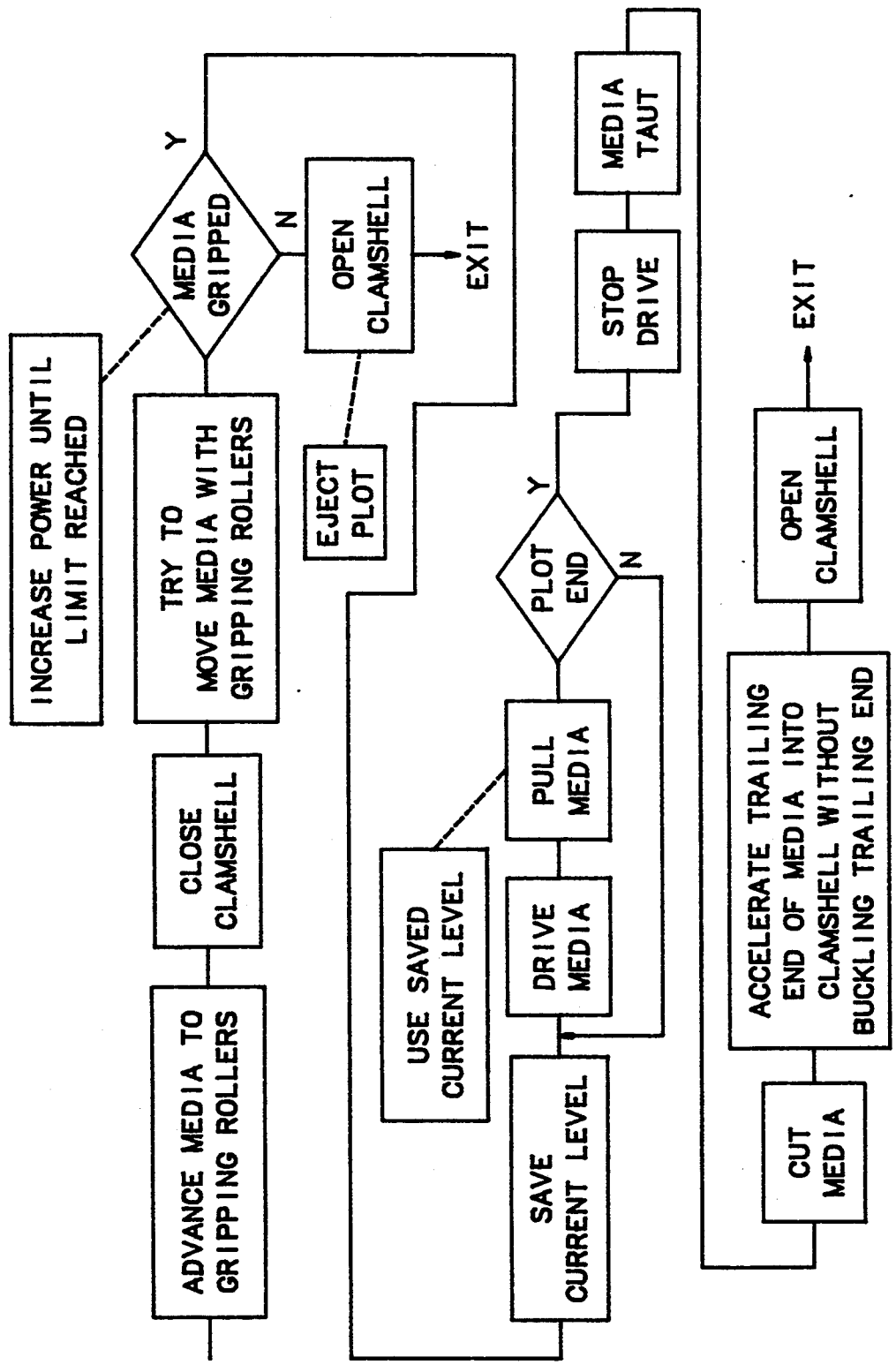
FIG. 6 is a logic flow diagram for the control system of FIG. 5.

In the present invention, the three drive motors 52, 60, and 64 are powered by adjustable voltage sources 66, 68, and 70, respectively. The polarity and level of the voltage of the adjustable voltage sources 66, 68, and 70 are individually set by the system control logic 72. The connections between the adjustable voltage sources 66 and 68 and their associated drive motors 52 and 60 contain current sensors 74 and 76, respectively. The rotational, i.e. "x" axis position, of the drive drum 17 is sensed by a position sensor 78 providing a digital output which is connected as an input to the logic 72. The signal outputs from the current sensors 74 and 76 are connected through analog to digital converters 80 as additional inputs to the logic 72. It is the current levels to the drive motors 52 and 60 as well as the position of the drive drum 17 which are used by the logic 72 to control the operation of the finished plot rolling apparatus 20 in a manner now to be described and as set forth in the flowchart of FIG. 6.

When plotting is finished, the logic 72 uses the drive motor 64 to advance the drive drum 17 an amount which should place the leading edge 82 of the media 12 where it will be gripped by the rollers 38 and 39 when the clamshell comprising the stationary portion 24 and the rotating portion 26 is closed. The clamshell is then closed by the logic causing the voltage source 66 to apply power to the drive motor 52 until the current level from the sensor 74 increases, indicating a stall condition. The voltage level is then reduced to a level sufficient to hold the clamshell closed.

The logic 72 then causes the voltage source 68 to apply a low voltage to the drive motor 60 in an attempt to gently pull the media 12 through the drive drum 17. To determine if the drum is being moved, the signal from the position sensor 78 is monitored. The voltage to the drive motor 60 is slowly increased until movement of the media is sensed or until an upper limit is reached without any movement. If the upper limit is reached without movement of the media being sensed, it is assumed that the media is not being gripped by the rollers 38, 39 for some reason (such as excessive media curling) and that an error condition exists. In that event, the clamshell is opened, the media 12 is cut, and the drive drum 17 and gravity are employed to push the finished plot out of the plotter and onto the floor.

The current to the drive motor 60 when it is stalled (i.e. insufficient voltage applied to cause media movement) is higher than the current when the motor 52 is moving. Thus, once movement of the drive drum 17 occurs indicating movement of the media 12, the current to the drive motor 60 is saved by the logic 72 as the current required to maintain the media 12 taut across the drive drum 17. The logic 72 then uses the voltage source 70 to cause the drive drum 17 to move the media 12 forward towards the plot handing apparatus 20 while simultaneously causing the drive motor 60 to operate at the saved proper tension-producing current and pull the media 12 into the plot handling apparatus 20. A feedback loop in the logic 72 constantly adjusts the voltage to the motor 60 to maintain the proper tension in the media 12. Too much current indicates that the motor 60 is pulling too hard and approaching a stall condition whereas too little current indicates that the motor 60 is not keeping up with the drive drum 17 and tension is being lost.

When the end of the plot is reached and the drive drum 17 stops moving the media 12, the logic 72 continues applying voltage to the drive motor 60 for a short period sufficient to tighten the media 12 across the plotter platen so that the cutting mechanism is able to cleanly cut the media 12 at the end of plot point.

After the media 12 is cut, the logic 72 must slowly accelerate the media 12 using the rollers 38, 39 through the drive motor 60 because a majority of the media 12 comprising the plot which was formerly moving into the clamshell and being rolled as it was being subjected to moving friction is now stopped. Thus, the trailing portion of the media 12 must be accelerated slowly since it is pushing against the static friction of the previously rolled portion within the clamshell. If the trailing media 12 is rapidly accelerated, it will be unable to start the rolled portion moving and will simply buckle between the rollers 38, 39 and the rolled portion.

Knowing the distance from the cutting mechanism to the rollers 38, 39, the logic 72 knows how long to run the drive motor 60 to pull the entire finished plot into the handler 20. The drive motor 52 is then employed by the logic 72 to open the clamshell and drop the rolled finished plot into the holding bin. Current sensing of the drive motor 52 by the current sensor 74 is again used by the logic 72 to tell when the clamshell is open (i.e. when the drive motor 52 stalls in the open direction).

Wherefore, having thus described the invention, what is claimed is:

1. A finished plot handing apparatus for receiving and rolling flexible media ejectable by a pen plotter at an exit point thereof, said pen plotter including a drive drum for moving and ejecting the media, the apparatus comprising:

a stationary member comprising a first input guide portion connected to a first partially-cylindrical portion wherein the first input guide portion has first and second edges and the first partially-cylindrical portion has first and second edges, the first edge of the first input guide portion being disposed adjacent the exit point of the pen plotter behind a path followed by a leading edge of the media as it is ejected from the pen plotter, and the second edge of the first input guide portion being connected to the first edge of the first partially-cylindrical portion;

a shaft disposed perpendicular to the path followed by the leading edge of the media and adjacent the second edge of the first partially-cylindrical portion opposite the first input guide portion;

first drive means for bi-directionally rotating the shaft;

a rotating member mounted on and rotating in combination with the shaft, the rotating member comprising a second input guide portion having first and second edges and a second partially-cylindrical portion having first and second edges, the first edge of the second partially-cylindrical portion being mounted on the shaft and the second edge of the second partially-cylindrical portion being connected to the first edge of the second input guide portion, the rotating member being rotatable between a closed position wherein the first partially-cylindrical portion and the second partially-cylindrical portion in combination form a cylindrical rolling chamber and the first input guide portion and the second input guide portion in combination form a guide slot into the cylindrical rolling chamber and an open position wherein the second partially-cylindrical portion and the second input guide portion form a ramp leading to a receiving point for the media located adjacent the second edge of the second input guide portion;

drive roller means disposed through the first input guide portion and perpendicular to the path followed by the leading edge of the media in the first input guide portion for contacting and moving the media through the guide slot into the cylindrical rolling chamber when the rotating member is in the closed position;

free-wheeling roller means carried by the second input guide portion and disposed opposite the drive roller means when the rotating member is in the closed position for holding the media against the drive roller means;

second drive means for rotating the drive roller means;

a control system comprising,
   a) first adjustable voltage means connected for applying a voltage to the first drive means,
   b) second adjustable voltage means connected for applying a voltage to the second drive means,
   c) first current sensing means for sensing current flowing from said first adjustable voltage means to said first drive means and for outputting a digital signal reflecting said current at an output thereof,
   d) second current sensing means for sensing current flowing from said second adjustable voltage means to said second drive means and for outputting a digital signal reflecting said current at an output thereof,
   e) position sensing means for sensing a rotational position of the drive drum of the pen plotter and for outputting a digital signal reflecting said rotational position at an output thereof, and,
   f) logic means having inputs connected to said output of said first current sensing means, said output of said second current sensing means, and said output of said position sensing means and outputs connected to said first adjustable voltage means, said second adjustable voltage means, and a motor driving the drive drum of the pen plotter, said logic means being employed for,
      f1) first, using said first adjustable voltage means to cause the first drive means to rotate the rotating member to the open position,
      f2) second, using said motor driving the drive drum to move a leading edge of the media to be rolled below the drive roller means,
      f3) third, using said first adjustable voltage means to cause the first drive means to rotate the rotating member to the closed position,
      f4) fourth, using said second adjustable voltage means starting at a low voltage to cause the second drive means to rotate the drive roller means to move the media through the guide slot into the cylindrical rolling chamber while sensing any movement of the drive drum with said position sensing means,
      f5) fifth, terminating a plot rolling process and using said first adjustable voltage means to cause the first drive means to rotate the rotating member to the open position to release the media if an upper voltage limit of said second adjustable voltage means is reached without movement of the drive drum being sensed,
      f6) sixth, saving a minimum current level to the second drive means causing movement of the drive drum,
      f7) seventh, using said second adjustable voltage means while adjusting the voltage level thereof to maintain current level to the second drive means at said minimum current level to keep the media taut without stalling the second drive means while simultaneously using said motor driving the drive drum to move the media towards the drive roller means to cause the second drive means to rotate the drive roller means to move said media through the guide slot into the cylindrical rolling chamber until an end of plot point of the media is reached,
      f8) eighth, holding the drive drum against rotation while continuing to apply voltage to the second drive means for a period of time sufficient to make the media taut for cutting and thereafter activating a cutting mechanism to cut the media and,
      f9) ninth, using said second adjustable voltage means starting at a low voltage to slowly accelerate the second drive means to rotate the drive roller means to move a trailing portion the media corresponding to a cut end of the media through the guide slot into the cylindrical rolling chamber against static friction of a previously rolled portion of the media within the cylindrical rolling chamber without buckling said trailing portion.

2. A control system for controlling a finished plot handling apparatus capable of receiving and rolling flexible media ejectable by a pen plotter at an exit point thereof, said pen plotter including a drive drum for moving and ejecting the media, said apparatus including, a stationary member including a first input guide portion connected to a first partially-cylindrical portion wherein the first input guide portion has first and second edges and the first partially-cylindrical portion has first and second edges, the first edge of the first input guide portion being disposed adjacent the exit point of the pen plotter behind a path followed by a leading edge of the media as it is ejected from the pen plotter, and the second edge of the first input guide portion being connected to the first edge of the first partially-cylindrical portion, a rotating member including a second input guide portion having first and second edges and a second partially-cylindrical portion having first and second edges, the first edge of the second partially-cylindrical portion being mounted for rotation about an axis of rotation and the second edge of the second partially-cylindrical portion being connected to the first edge of the second input guide portion, the rotating member being rotatable between a closed position wherein the first partially-cylindrical portion and the second partially-cylindrical portion in combination form a cylindrical rolling chamber and the first input guide portion and the second input guide portion in combination form a guide slot into the cylindrical rolling chamber and an open position wherein the second partially-cylindrical portion and the second input guide portion form a ramp leading to a receiving point for the media located adjacent the second edge of the second input guide portion, first drive means for bi-directionally rotating the rotating member about said axis of rotation, drive roller means disposed through the first input guide portion perpendicular to the path followed by the leading edge of the media in the first input guide portion for contacting and moving the media through the guide slot into the cylindrical rolling chamber when the rotating member is in the closed position, and second drive means for rotating the drive roller means, said control system for controlling the finished plot handling apparatus comprising:
a) first adjustable voltage means connected for applying a voltage to the first drive means;
b) second adjustable voltage means connected for applying a voltage to the second drive means;
c) first current sensing means for sensing current flowing from said first adjustable voltage means to said first drive means and for outputting a digital signal reflecting said current at an output thereof;
d) second current sensing means for sensing current flowing from said second adjustable voltage means to said second drive means and for outputting a digital signal reflecting said current at an output thereof;
e) position sensing means for sensing a rotational position of the drive drum and for outputting a digital signal reflecting said rotational position at an output thereof; and,
f) logic means having inputs connected to said output of said first current sensing means, said output of said second current sensing means, and said output of said position sensing means and outputs connected to said first adjustable voltage means, said second adjustable voltage means, and a motor driving the drive drum said logic means being employed for, f1) first, with the rotating member in the open position, using said motor driving the drive drum to move a leading edge of the media to be rolled to a position below the drive roller means, f2) second, using said first adjustable voltage means to cause the first drive means to rotate the means to cause the first drive means to rotate the rotating member to the closed position, f3) third, starting at a low voltage using said second adjustable voltage means to cause the second drive means to rotate. the drive roller means to move the media through the guide slot into the cylindrical rolling chamber while sensing any movement of the drive drum with said position sensing means, f4) fourth, terminating a plot rolling process and using said first adjustable voltage means to cause the first drive means to rotate the rotating member to the open position to release the media if an upper voltage limit of said second adjustable voltage means is reached without movement of the drive drum being sensed, f5) fifth, saving a minimum current level to the second drive means causing movement of the drive drum, f6) sixth, using said second adjustable voltage means while adjusting the voltage level thereof to maintain current level to the second drive means at said minimum current level to keep the media taut without stalling the second derive means while simultaneously using said motor driving the drive drum to move the media towards the drive roller means to cause the second drive means to rotate the drive roller means to move the media through the guide slot into the cylindrical rolling chamber until an end of plot point of the media is reached, f7) seventh, holding the drive drum against rotation while continuing to apply voltage to the second drive means for a period of time sufficient to make the media taut for cutting, f8) eighth, activating a cutting mechanism to cut the media, and f9) ninth, starting at a low voltage using said second adjustable voltage means to accelerate the second drive means to rotate the drive roller means to move a trailing portion the media corresponding to a cut end of the media through the guide slot into the cylindrical rolling chamber at a rate sufficient to overcome static friction of a previously rolled portion of the media within the cylindrical rolling chamber without buckling said trailing portion.

3. A method for controlling a finished plot handling apparatus of a pen plotter, wherein said pen plotter is capable of ejecting a flexible media from an exit point thereof and includes a drive drum for moving and ejecting the media, and wherein the finished plot handling apparatus used for receiving the media at the exit point of the pen plotter and for rolling the media upon ejection from the pen plotter includes a stationary member having a first input guide portion connected to a first partially-cylindrical portion wherein the first input guide portion has first and second edges and the first partially-cylindrical portion has first and second edges, the first edge of the first input guide portion being disposed adjacent the exit point of the pen plotter behind a path followed by a leading edge of the media as it is ejected from the pen plotter, and the second edge of the first input guide portion being connected to the first edge of the first partially-cylindrical portion; a rotating member having a second input guide portion having first and second edges and a second partially-cylindrical portion having first and second edges, the first edge of the second partially-cylindrical portion being mounted for rotation about an axis of rotation and the second edge of the second partially-cylindrical portion being connected to the first edge of the second input guide portion, the rotating member being rotatable between a closed position wherein the first partially-cylindrical portion and the second partially-cylindrical portion in combination form a cylindrical rolling chamber and the first input guide portion and the second input guide portion in combination form a guide slot into the cylindrical rolling chamber and an open position wherein the second partially-cylindrical portion and the second input guide portion form a ramp leading to a receiving point for the media located adjacent the second edge of the second input guide portion; first drive means for bi-directionally rotating the rotating member about the axis of rotation; drive roller means disposed through the first input guide portion perpendicular to the path followed by the leading edge of the media in the first input guide portion for contacting and moving the media through the guide slot into the cylindrical rolling chamber when the rotating member is in the closed position; and, second drive means for rotating the drive roller means, the method comprising the steps of:

a) connecting first adjustable voltage means to apply a voltage to the first drive means;
b) connecting second adjustable voltage means to apply a voltage to the second drive means;
c) connecting first current sensing means to sense current flowing from the first adjustable voltage means to the first drive means and output a digital signal reflecting that current;
d) connecting second current sensing means to sense current flowing from the second adjustable voltage means to the second drive means and output a digital signal reflecting that current;
e) connecting position sensing means to sense a rotational position of the drive drum and output a digital signal reflecting the rotational position;
f) with the rotating member in the open position, using the motor driving the drive drum to move a leading edge of the media to be rolled to a position below the drive roller means;
g) using the first adjustable voltage means to cause the first drive means to rotate the rotating member to the closed position;
h) starting at a low voltage using the second adjustable voltage means to cause the second drive means to rotate the drive roller means to move the media through the guide slot into the cylindrical rolling chamber while sensing any movement of the drive drum with the position sensing means;
i) terminating a plot rolling process and using the first adjustable voltage means to cause the first drive means to rotate the rotating member to the open position to release the media if an upper voltage limit of the second adjustable voltage means is reached without movement of the drive drum being sensed;
j) saving a minimum current level to the second drive means causing movement of the drive drum;
k) using the second adjustable voltage means while adjusting the voltage level thereof to maintain current level to the second drive means at the minimum current level to keep the media taut without stalling the second drive means while simultaneously using the motor driving the drive drum to move the media towards the drive roller means to cause the second drive means to rotate the drive roller means to move the media through the guide slot into the cylindrical rolling chamber until an end of plot point of the media is reached;
l) holding the drive drum against rotation while continuing to apply voltage to the second drive means for a period of time sufficient to make the media taut for cutting;
m) activating a cutting mechanism to cut the media; and,
n) starting at a low voltage using the second adjustable voltage means to accelerate the second drive means to rotate the drive roller means to move a trailing portion of the media corresponding to a cut end of the media through the guide slot into the cylindrical rolling chamber at a rate sufficient to overcome static friction of a previously rolled portion of the media within the cylindrical rolling chamber without buckling the trailing portion.

4. A method for operating a finished plot handling apparatus of a pen plotter, wherein said pen plotter is capable of ejecting a flexible media from an exit point thereof and includes a drive drum for moving and ejecting the media, and wherein the finished plot handling apparatus for receiving the media at the exit point of the pen plotter and for rolling the media upon ejection from the pen plotter includes a stationary member having a first input guide portion connected to a first partially-cylindrical portion wherein the first input guide portion has first and second edges and the first partially-cylindrical portion has first and second edges, the first edge of the first input guide portion being disposed adjacent the exit point of the pen plotter behind a path followed by a leading edge of the media as it is ejected from the pen plotter, and the second edge of the first input guide portion being connected to the first edge of the first partially-cylindrical portion; a rotating member having a second input guide portion having first and second edges and a second partially-cylindrical portion having first and second edges, the first edge of the second partially-cylindrical portion being mounted for rotation about an axis of rotation and the second edge of the second partially-cylindrical portion being connected to the first edge of the second input guide portion, the rotating member being rotatable between a closed position wherein the first partially-cylindrical portion and the second partially-cylindrical portion in combination form a cylindrical rolling chamber and the first input guide portion and the second input guide portion in combination form a guide slot into the cylindrical rolling chamber and an open position wherein the second partially-cylindrical portion and the second input guide portion form a ramp leading to a receiving point for the media located adjacent the second edge of the second input guide portion; first drive means for bi-directionally rotating the rotating member about the axis of rotation; drive roller means disposed through the first input guide portion perpendicular to the path followed by the leading edge of the media in the first input guide portion for contacting and moving the media through the guide slot into the cylindrical rolling chamber when the rotating member is in the closed position; and, second drive means for rotating the drive roller means, the method comprising the steps of:

a) with the rotating member in the open position, moving a leading edge of the media to be rolled to a position below the drive roller means;

b) rotating the rotating member to the closed position;

c) starting at a low power level rotating the drive roller means to move the media through the guide slot into the cylindrical rolling chamber while sensing any movement of the drive drum;

d) terminating a plot rolling process and rotating the rotating member to the open position to release the media if an upper power limit rotating the drive roller means is reached without movement of the drive drum being sensed;

e) rotating the drive roller means to move the media through the guide slot into the cylindrical rolling chamber while simultaneously using the motor driving the drive drum to move the media towards the drive roller means;

f) adjusting power to the drive roller means at a level to keep the media taut without stalling the second drive means while moving the media through the guide slot into the cylindrical rolling chamber until an end of plot point of the media is reached;

g) holding the drive drum against rotation while continuing to rotate the drive roller means for a period of time sufficient to make the media taut for cutting;

h) activating a cutting mechanism to cut the media; and, i) accelerating the drive roller means to move a trailing portion of the media through the guide slot into the cylindrical rolling chamber at a rate which overcomes static friction of a previously rolled portion of the media within the cylindrical rolling chamber without buckling the trailing portion.

* * * * *